3,479,176
METHOD AND MULTIPHASE COMPOSITION FOR CONTROLLING PESTS
Forrest Arthur Wilson, San Antonio, Tex., assignor to Stull Chemical Company, San Antonio, Tex.
No Drawing. Filed Mar. 23, 1966, Ser. No. 536,607
Int. Cl. A01n 17/10, 9/36, 9/24
U.S. Cl. 71—94                                    18 Claims

ABSTRACT OF THE DISCLOSURE

A pest-treating composition of the invert (water-in-oil) emulsion type where the internal or discontinuous portion of the invert emulsion comprises a multiphase aqueous system, such as a conventional (oil-in-water) emulsion, and at least one pesticide is contained in at least one of the several discrete multiple phases of the invert emulsion.

---

This invention relates to a method and composition for controlling pests and has particular reference to a new type of invert emulsion and the use of same for pest control purposes.

The term "pests" is used in its broadest sense and includes vegetation, insects, fungus, and the like, growing or occurring in any location where they are not wanted.

An object of this invention is to provide means for reducing drift and volatilization of pesticide sprays and at the same time to provide for increased spread or coverage of the sprays after they reach the target.

Another object of the invention is to provide a pesticide composition of the invert emulsion type that is more flexible in terms of types and dosage rates of pesticides which can be dispersed in the invert emulsion than is possible with invert emulsion pesticide compositions now known.

Invert emulsion pesticide sprays are well known in the art and their use is increasing rapidly. Some of the advantages of invert emulsion pesticide sprays as compared to conventional oil-in-water or solution sprays are said to include: reduced drift and volatilization of the spray, increased rain resistance, and improved penetration in the case of systemic pesticides.

One important disadvantage of presently used invert emulsion pesticide sprays is that the spray droplets have very little tendency to spread after they impact on the target. Thus, the effective coverage at a given spray volume which has already been reduced because the invert spray droplets are generally larger than conventional spray droplets is further reduced.

Another disadvantage of present invert emulsion pesticide sprays is their lack of flexibility, particularly with regard to the types of pesticides which can be used and the dosage rates of the pesticides obtainable with a given invert emulsifiable concentrate.

The foregoing and other objects and advantages can be realized and the disadvantages overcome in accordance with this invention by a pest treating composition comprising: an invert emulsion having at least three discrete phases and at least one pesticide dispersed in at least one of said discrete phases in an amount sufficient to accomplish its intended purpose.

In a preferred embodiment, this invention provides a pest treating composition of the invert emulsion type comprising: (a) an external oil system; and (b) a multiphase internal aqueous system, at least one of said external oil and internal aqueous systems containing at least one pesticide in an amount sufficient to accomplish its intended purpose. It is frequently advantageous to employ a conventional or oil-in-water emulsion as the multiphase internal aqueous system.

As will be understood, the types and amounts of pesticides useful in practicing the process of this invention can vary widely, and for any particular case the selection of the most desirable type of pesticide or pesticides and the amount of such pesticides that should be employed in order to accomplish the intended purpose is well within the skill of those in the art. Further, one or more of the pesticides to be employed can be dispersed in one, more or all of the discrete phases contained in the invert emulsion. For example, in the case of an invert emulsion having an external oil system and a multiphase internal aqueous system comprising an oil-in-water emulsion, one or more pesticides may be dispersed in: the oil phase of the oil-in-water emulsion, in the water phase of the oil-in-water emulsion, in the external oil system, and/or in any combination or all of said discrete phases of the invert emulsion. Also, the pesticides may be of the same type or may be of different types with regard to such characteristics as mode of action (systemic or contact), pest to be controlled (herbicides, insecticides, fungicides, and the like), physical state (wettable powders, liquids).

The following examples will serve to illustrate the composition and process of this invention, but should not be taken to unduly limit the invention, either in spirit or in scope.

Example 1

Bivert (a tradename for a commercially available invert emulsifiable concentrate containing an oil but no pesticide) was mixed with a previously prepared aqueous suspension of O,O-dimethyl 2,2,2 - trichloro-1-hydroxyethyl phosphonate (a wettable powder insecticide formulation commercially available under the tradename Dylox). An invert emulsion was produced having the following characteristics:

A. An external oil system (Bivert) containing no pesticide; and a

B. Multi-phase internal aqueous system comprising discrete solid particles of insecticide (Dylox) suspended in water.

Example 2

Example 1 was repeated, except that an emulsifiable concentrate of O,O-diethyl O(and S)-2-(ethylthio)ethyl phosphorothioates, commercially available under the tradename Systox, was incorporated into the aqueous suspension of Dylox prior to mixing with Bivert. An invert emulsion was produced having the following characteristics:

A. An external oil system (Bivert) containing no pesticide; and a

B. Multiphase internal aqueous system comprising an oil-in-water emulsion having an insecticide (Systox) in the oil phase thereof and discrete solid particles of another insecticide (Dylox) suspended in the water phase.

Example 3

Example 2 was repeated, except that an emulsifiable concentrate of 1,2 dibromo-2,2-dichloroethyl dimethyl phosphate (commercially available under the tradename Dibrom) was also incorporated into the aqueous suspension of Dylox prior to mixing with Bivert. An invert emulsion was produced having the following characteristics:

A. An external oil system (Bivert) containing no pesticide; and a

B. Multiphase internal aqueous system comprising an oil-in-water emulsion having two insecticides (Systox and Dibrom) in the oil phase thereof and discrete solid particles of another insecticide (Dylox) suspended in the water phase.

Example 4

Example 3 was repeated, except that Instemul DDT (a tradename for a commercially available invert emulsifiable concentrate containing dichlorodiphenyltrichlorethane, hereinafter referred to as DDT) rather than Bivert was mixed with the previously prepared aqueous suspension of Example 3. An invert emulsion was produced having the following characteristics:

A. An external oil system (Instemul DDT) containing an insecticide (DDT); and a

B. Multiphase internal aqueous system comprising an oil-in-water emulsion having two insecticides (Systox and Dibrom) in the oil phase thereof and discrete solid particles of another insecticide (Dylox) suspended in the water phase.

Example 5

Instemul DDT was mixed with a previously prepared oil-in-water emulsion of 3,4 dichloropropionanilide (commercially available as emulsifiable concentrates under the tradenames of Stam or Rogue). An invert emulsion was produced having the following characteristics:

A. An external oil system (Instemul DDT) containing an insecticide (DDT); and a

B. Multiphase internal aqueous system comprising an oil-in-water emulsion containing a herbicide (Stam or Rogue) in the oil phase thereof.

Example 6

Instemul DA 120 (a tradename for a commercially available invert emulsifiable concentrate containing an oil soluble amine salt of 2,4-dichlorophenoxyacetic acid, hereinafter referred to as 2,4-D) was diluted with diesel fuel and the diesel-diluted chemical was then mixed with a previously prepared oil-in-water emulsion of 2,4-D butyl ester. An invert emulsion was produced having the following characteristics:

A. An external oil system (diesel-diluted Instemul DA 120) containing a relatively non volatile herbicide (oil soluble amine salt of 2,4-D); and a B. Multiphase internal aqueous system comprising an oil-in-water emulsion containing a relatively high volatile herbicide (butyl ester of 2,4-D) in the oil phase thereof.

Example 7

Example 6 was repeated, except that 4-amino-3,5,6 trichloropicolinic acid (a water soluble herbicide commercially available under the tradename Tordon) was incorporated into the oil-in-water emulsion of 2,4-D butyl ester prior to mixing with the diesel-diluted Instemul DA 120. An invert emulsion was produced having the following characteristics:

A. An external oil system (diesel-diluted Instemul DA 120) containing a relatively non volatile herbicide (oil soluble amine salt of 2,4-D); and a B. Multiphase internal aqueous system comprising an oil-in-water emulsion containing a relatively high volatile herbicide (butyl ester of 2,4-D) in the oil phase thereof and a relatively low volatile herbicide (Tordon) in the water phase.

Example 8

Instemul TA 120 (a tradename for a commercially available invert emulsifiable concentrate containing an oil soluble amine salt of 2,4,5-trichlorophenoxyacetic acid, hereinafter referred to as 2,4,5-T) was diluted with diesel fuel and this diesel-diluted chemical was then mixed with a previously prepared oil-in-water emulsion of Dacamine (a tradename for a commercially available emulsifiable concentrate containing oil soluble diamine salts of 2,4-D). An invert emulsion was produced having the following characteristics:

A. An external oil system (diesel-diluted Instemul TA 120) containing a relatively non volatile herbicide (oil soluble amine salt of 2,4,5-T); and a B. Multiphase internal aqueous system comprising an oil-in-water emulsion containing a relatively non volatile herbicide (oil soluble diamine salts of 2,4-D) in the oil phase thereof.

Example 9

Example 8 was repeated, except that Dalapon (a tradename for (2,2-dichloropropionic acid) sodium salt) was incorporated into the oil-in-water emulsion of Dacamine prior to mixing with the diesel-diluted Instemul TA 120. An invert emulsion was produced having the following characteristics:

A. An external oil system (diesel-diluted Instemul TA 120) containing a relatively non volatile herbicide (oil soluble amine salt of 2,4,5-T); and a B. Multiphase internal aqueous system comprising an oil-in-water emulsion containing a relatively non volatile herbicide (oil soluble diamine salts of 2,4-D) in the oil phase thereof and another relatively non volatile herbicide (Dalapon) in the water phase.

As can be seen from the foregoing examples, the pest treating invert emulsion composition of this invention is similar to invert emulsions of this type presently known to those in the art in that the continuous or external phase of the emulsion comprises a single phase oil system. However in all other respects the invert emulsion of this invention is completely different from presently known invert emulsions. For example, the disperse or internal portion of the invert emulsion of this invention comprises a multiphase aqueous system, rather than a single phase water system as is the case with presently known invert emulsion pesticide sprays.

This multiphase disperse feature of the invert emulsion pesticide spray of this invention provides many important and desirable advantages. For example, normally incompatible pesticides can now be utilized in the same invert emulsion spray mixture by incorporating one of the pesticides in one phase of the invert emulsion and the other pesticide in a second phase of the invert emulsion, these two phases being separated by a third phase so that the incompatible pesticides do not come into contact with one another. Further, the composition of this invention provides means for treating any type of pest complex with an invert emulsion spray containing appropriate pesticides in required amounts without requirement of employing specially formulated invert emulsion concentrates of each different pesticide at each different concentration as is now required. That is, the composition of this invention makes it possible to incorporate into the multiphase discontinuous aqueous system at least a portion of the desired type and amount of pesticide to be contained in the invert emulsion spray mixture by utilizing the pesticides in their usual commercially available form (oil-in-water emulsifiable concentrates, water soluble powders, wettable powders).

In applying the pest treating compositions of this invention to pest infested areas it was observed that all of the advantages normally associated with invert emulsion pesticide sprays were realized and at the same time the disadvantages often encountered with invert emulsion sprays were avoided. For example, drift and volatilization of the spray mixture was substantially reduced as compared to conventional sprays. Further, the spread of the spray droplets after impacting on the target was much greater than the spread of presently known invert emulsion pesticide sprays, and in most cases was even greater than the spread of conventional spray droplets. While the reason for this has not been firmly established, it is nonetheless of vital importance since it permits one to enjoy the advantages of invert emulsion pesticide sprays with regard to confinement of the spray to the target without sacrifice of coverage on the target. Consequently, equivalent results can be obtained at reduced dosage rates and improved results can be obtained at equivalent dosage rates.

From the foregoing, it will be seen that this invention is one well adapted to attain all of the ends and objects hereinabove set forth, together with other advantages which are obvious and which are inherent to the composition and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all the matter herein set forth is to be interpreted as illustrative and not in a limiting sense.

The invention having been described, what is claimed is

1. A pest treating composition comprising:
   (a) an external oil system; and
   (b) a multiphase internal aqueous system having water as its continuous phase, at least one of said external oil and internal aqueous systems containing at least one pesticide in an amount sufficient to accomplish its intended purpose.

2. A pest treating composition according to claim 1 further characterized in that: said multiphase internal aqueous system comprises an oil-in-water emulsion.

3. A pest treating composition according to claim 1 further characterized in that: at least one pesticide is contained in said multiphase internal aqueous system.

4. A pest treating composition according to claim 1 further characterized in that: at least one pesticide is contained in each of said external oil system and said multiphase internal aqueous system.

5. A pest treating composition according to claim 2 further characterized in that: a pesticide is contained in the oil phase of said oil-in-water emulsion.

6. A pest treating composition according to claim 2 further characterized in that: a pesticide is contained in the water phase of said oil-in-water emulsion.

7. A pest treating composition according to claim 2 further characterized in that: a pesticide is contained in each of the oil phase and water phase of said oil-in-water emulsion.

8. A pest treating composition according to claim 5 further characterized in that: a pesticide is contained in said external oil system.

9. A pest treating composition according to claim 6 further characterized in that: a pesticide is contained in said external oil system.

10. A pest treating composition according to claim 7 further characterized in that: a pesticide is contained in said external oil system.

11. A process for controlling pests comprising: treating the locus of pest infestation with an emulsion composition having an external oil system and a multiphase internal aqueous system, said multiphase internal aqueous system having water as its continuous phase and at least one of said oil and aqueous systems containing at least one pesticide in an amount sufficient to accomplish its intended purpose.

12. A process according to claim 11 further characterized in that: said multiphase internal aqueous system comprises an oil-in-water emulsion.

13. A process according to claim 12 further characterized in that: a pesticide is contained in the oil phase of said oil-in-water emulsion.

14. A process according to claim 12 further characterized in that: a pesticide is contained in the water phase of said oil-in-water emulsion.

15. A process according to claim 12 further characterized in that: a pesticide is contained in each of the oil and water phases of said oil-in-water emulsion.

16. A process according to claim 13 further characterized in that: a pesticide is contained in said external oil system.

17. A process according to claim 14 further characterized in that: a pesticide is contained in said external oil system.

18. A process according to claim 15 further characterized in that: a pesticide is contained in said external oil system.

References Cited

UNITED STATES PATENTS

| 2,558,762 | 7/1951 | Kohr et al. | 71—65 |
| 3,189,430 | 6/1965 | Kelly et al. | 71—110 |

FOREIGN PATENTS 815,510  6/1959  Great Britain.

LEWIS GOTTS, Primary Examiner

C. L. MILLS, Assistant Examiner

U.S. Cl. X.R.

424—222, 225, 354